(12) United States Patent
Siemer et al.

(10) Patent No.: US 7,441,757 B2
(45) Date of Patent: Oct. 28, 2008

(54) HYDRAULICALLY DAMPING BUSH BEARING

(75) Inventors: Hubert Siemer, Dinklage (DE); Josef Burwinkel, Dinklage (DE); Stefan Loheide, Wallenhorst (DE); Burkhard Meyer, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/596,527

(22) PCT Filed: Dec. 9, 2004

(86) PCT No.: PCT/DE2004/002696

§ 371 (c)(1), (2), (4) Date: Mar. 7, 2007

(87) PCT Pub. No.: WO2005/059398

PCT Pub. Date: Jun. 30, 2005

(65) Prior Publication Data

US 2007/0246870 A1    Oct. 25, 2007

(30) Foreign Application Priority Data

Dec. 16, 2003    (DE) ................................ 103 59 340

(51) Int. Cl.
    *F16M 5/00*    (2006.01)
(52) U.S. Cl. .................................. 267/140.12
(58) Field of Classification Search ............ 267/140.12, 267/293
    See application file for complete search history.

(56) References Cited

U.S. PATENT DOCUMENTS 4,749,173 A * 6/1988 Kanda .................... 267/140.12

(Continued)

FOREIGN PATENT DOCUMENTS

DE            4117129 A1    11/1992

(Continued)

*Primary Examiner*—Christopher P Schwartz
(74) *Attorney, Agent, or Firm*—McGlew & Tuttle, P.C.

(57) ABSTRACT

A hydraulically damping bush bearing (1) has an inner part (1) with a hole (3) extending along a longitudinal axis (4); an outer sleeve (9) surrounding the inner part (2); an elastomeric damping member (6) arranged between the inner part (2) and the outer sleeve (9); and at least two chamber pairs (21, 24) with at least two separate chambers (19, 20; 22, 23) each, which are filled with a hydraulic fluid. The two chambers (19, 20) of a first chamber pair (21) are arranged axially along the longitudinal axis (4) and the two chambers (22, 23) of a second chamber pair (24) are arranged radially in relation to the longitudinal axis (4) and are arranged in the axial direction of the longitudinal axis (4) between the two chambers (19, 20) of the first chamber pair (21); a channel carrier (13), which connects to one another the two chambers (19, 20; 22, 23) each of one of the chamber pairs (21, 24) via at least one damping channel (25, 26) each arranged in or at the channel carrier (13); and an outer bush (12), which surrounds the elastomeric damping member (6), the outer sleeve (9), the channel carrier (13) as well as the at least two chamber pairs (21, 24). The chambers (19, 20) of the first chamber pair (21) and the chambers (22, 23) of the second chamber pair (24) overlap in some areas at least an axial partial section (A, B) in relation to the longitudinal axis (4).

24 Claims, 5 Drawing Sheets

U.S. PATENT DOCUMENTS

| | | |
|---|---|---|
| 4,840,357 A | 6/1989 | Jouade |
| 4,871,152 A * | 10/1989 | Funahashi ............... 267/140.12 |
| 4,872,651 A * | 10/1989 | Thorn ................... 267/140.12 |
| 5,172,893 A | 12/1992 | Bouhier et al. |
| 5,178,376 A * | 1/1993 | Hamaekers et al. .... 267/140.12 |
| 5,509,643 A * | 4/1996 | Carstens et al. ........ 267/140.12 |
| 5,690,320 A * | 11/1997 | Kanda ................... 267/140.12 |
| 6,364,298 B1 * | 4/2002 | Vossel et al. ................. 267/293 |
| 6,561,501 B2 | 5/2003 | Bouhier et al. |
| 6,698,731 B2 * | 3/2004 | Thornhill ............... 267/140.12 |
| 2002/0020950 A1 | 2/2002 | Bouhier et al. |
| 2003/0151178 A1 * | 8/2003 | Vossel et al. ........... 267/140.12 |

FOREIGN PATENT DOCUMENTS

| | | |
|---|---|---|
| DE | 69101803 T2 | 11/1994 |
| DE | 19713003 A1 | 10/1998 |
| DE | 10029267 A1 | 1/2001 |
| DE | 10029268 A1 | 1/2001 |
| DE | 10118229 A1 | 11/2002 |
| DE | 19936014 C2 | 4/2003 |
| EP | 0452169 A1 | 10/1991 |

* cited by examiner

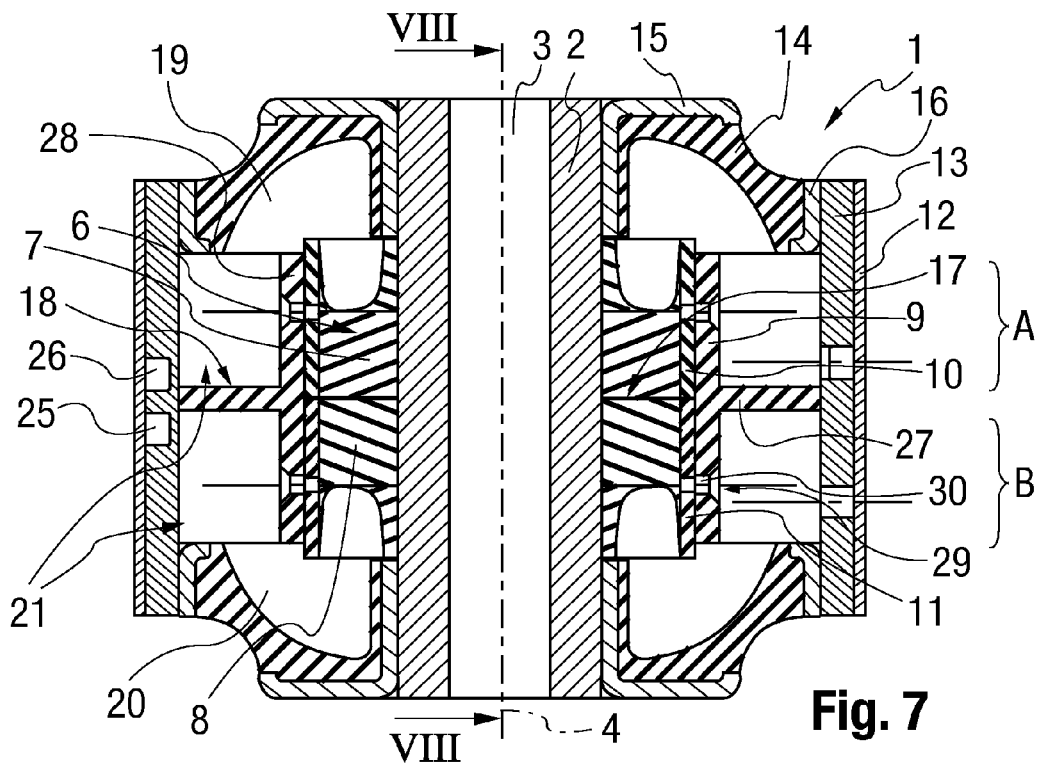
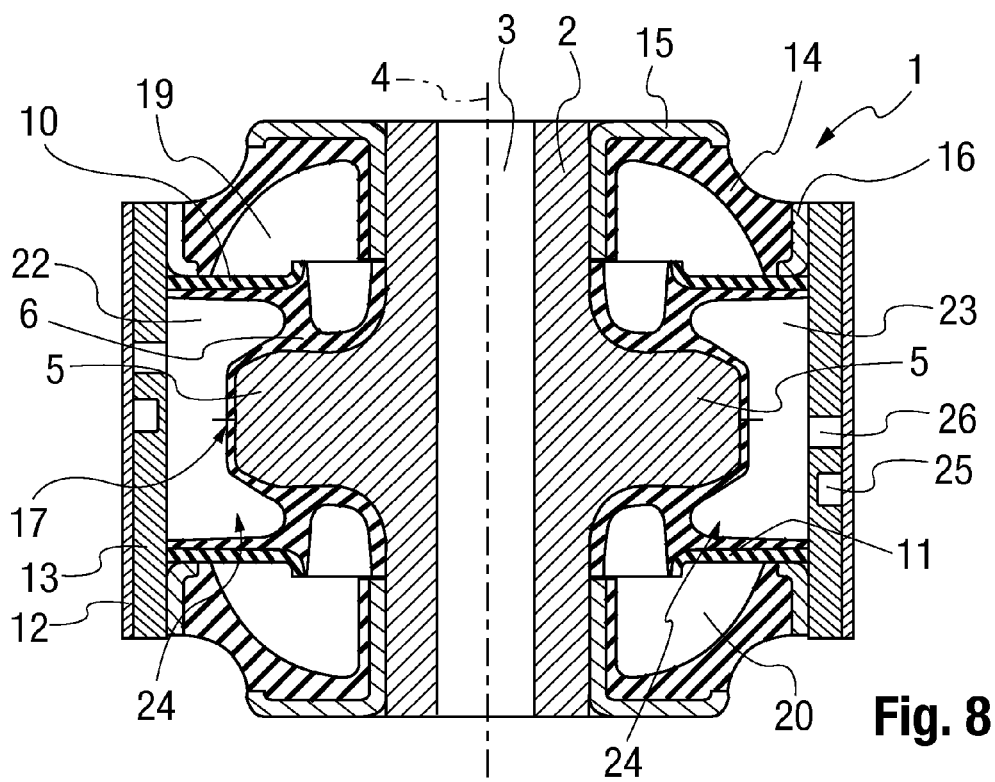

HYDRAULICALLY DAMPING BUSH BEARING

CROSS REFERENCE TO RELATED APPLICATIONS

This application is a United States National Phase application of International Application PCT/DE 2004/002696 and claims the benefit of priority under 35 U.S.C. § 119 of German Patent Application DE 103 59 340.3 filed Dec. 16, 2003, the entire contents of which are incorporated herein by reference.

FIELD OF THE INVENTION

The present invention pertains to a hydraulically damping bush bearing, a so-called hydraulic bearing, in which the hydraulic area is formed from at least two chamber pairs for damping in both the radial direction and the axial direction, wherein each chamber pair is formed from at least two separate chambers, which are connected to one another via at least one damping channel.

BACKGROUND OF THE INVENTION

To damp vibrations and to absorb forces, bearings of a great variety of designs, mainly rubber bearings, are used in many different ways. In automotive engineering, they are used, for example, to mount parts of the wheel suspension or the drive assemblies of vehicles. It is known that depending on the application, the damping action of elastomeric damping members is additionally supported by hydraulic damping. To utilize the amortizing effect caused by the weight of liquid, chambers are provided in the elastomeric insert parts or rubber bodies of the chamber to receive a fluid damping agent. The chambers, whose size and position in the bearing depends on the required tuning, are connected to one another in a flow-carrying manner by one or more special channels, which are formed in special moldings that are additionally integrated in the bearing. Depending on the stress on the bearing, the damping agent is thus pressed from one chamber into another. Both bearings in which the hydraulic damping is used in respect to forces introduced radially into the bearing and bearings in which mainly the axial damping is supported by the damping liquid are known in this connection. Bearings in which the amortizing effect of the damping agent in the axial and radial directions is utilized are known as well.

Such a bearing, in which an elastomeric damping member is arranged between an inner part and an outer sleeve, is known from DE 691 01 803 T2. A first, fluid-filled chamber pair is arranged within the elastomeric damping member, and the two chambers belonging to it are located at the opposite ends of the bearing and frequency-dependent damping is brought about in the axial direction of the bearing. A second chamber pair with radially opposite chambers, which is provided for the radial damping, is arranged between this first chamber pair in the elastomeric damping member. The axially acting and the radially acting chambers are connected to one another via damping channels arranged in a channel carrier provided in the interior of the inner part. An essential drawback of this embodiment is the arrangement of the channel carrier in the interior of the inner part, as a result of which the damping channels, and consequently the damping characteristic can be varied to a very limited extent only.

Furthermore, the very large-volume elastomeric damping member, a very broad elastomeric area being recognizable between the inner part and the outer sleeve especially outside the radial damping chambers, has an unfavorable effect on the damping characteristic of the bearing. Such large-volume elastomeric areas require a relatively large space for their installation and require the use of a corresponding amount of material, which causes a considerable cost. Moreover, this bush bearing is very large in the axial direction, due to the arrangement of the chambers.

SUMMARY OF THE INVENTION

The object of the present invention is therefore to provide a hydraulically damping bush bearing, in which the hydraulic area is formed from at least two chamber pairs for damping both in the radial direction and the axial direction, and which has a compact design and can be manufactured simply and at a low cost.

The bush bearing according to the present invention has an inner part with a hole extending along a longitudinal axis, wherein the inner part is surrounded by an outer sleeve and at least one elastomeric damping member is present between the inner part and the outer sleeve. Furthermore, the bush bearing comprises at least one first and one second chamber pair, wherein each chamber pair is formed from two separate chambers. The chambers of the first chamber pair are arranged axially along the longitudinal axis of the bush bearing and the two chambers of the second chamber pair are arranged radially in relation to the longitudinal axis as well as in the axial direction between the two chambers of the first chamber pair. The chamber pairs are connected via at least one damping chamber each, which is provided in a channel carrier arranged between the outer sleeve and an outer bush located on the outside. The chambers of the bush bearing are arranged according to the present invention such that the chambers of the first chamber pair and the chambers of the second chamber pair overlap at least in some areas at least in a partial area that is axial in relation to the longitudinal axis. Accordingly, both at least parts of chambers of the first chamber pair and chambers or parts of the chambers of the second chamber pair are arranged one after another within a ring directed at right angles to the longitudinal axis along a circular line extending concentrically with the ring. Due to this arrangement, the volume needed for the chambers arranged at the axial ends can be displaced into areas toward the center of the bush bearing, namely, precisely into the areas that are usually filled by an elastomer. Thus, the present invention leads, on the one hand, to the embodiment of a very compact bush bearing, especially in the axial direction, and, on the other hand, large-volume elastomeric areas are avoided. Moreover, the amount of material used is substantially reduced in this manner concerning the elastomer, so that the cost can be considerably reduced. Moreover, the more compact design of the bush bearings creates the possibility of preparing more vulcanization nests in the vulcanization molds, so that a larger number of bush bearings can be manufactured per vulcanization operation.

To produce a stop for limiting the radial deflection of the inner part in relation to the outer sleeve, projections are arranged at the inner part of the bush bearing in an advantageous embodiment, as a result of which the chamber volume can also be affected in a simple manner.

The outer sleeve, which surrounds the inner part and the elastomeric damping member, is advantageously arranged at least in partial areas, at a spaced location from the outer bush and from a channel carrier arranged between the outer bush and the outer sleeve, so that the space present between the outer sleeve and the outer bush or the outer sleeve and the channel carrier can be used as a volume for the chambers of the first chamber pair, which are arranged at the axial ends of the bush bearing. Thus, this arrangement makes it possible to arrange the chambers of the first chamber pair and of the second chamber pair directly adjacent, separated by a thin partition of the elastomeric damping member only, not only in the axial direction, but they can also be arranged directly adjacent in a plane that is parallel to the longitudinal axis. The chambers of the first and second chamber pairs are separated here by the fixed wall of the outer sleeve as well as optionally by a layer of the elastomeric damping member. At least one chamber of the first chamber pair directly adjoins a chamber of the second chamber pair in a plane inclined in relation to a right angle to the longitudinal axis.

To separate the chambers of the first chamber pair, which are arranged at the axial ends of the bush bearing, the outer sleeve may be provided, in a preferred embodiment, with a web, which connects the outer sleeve to the channel carrier or the outer bush. If the channel carrier or the outer bush has a cylindrical design, the web is designed in the form of a segment of a circle. This web separates the chambers of the first chamber pair, which are arranged at the axial ends of the bush bearing. Thus, the chambers of the first chamber pair are also arranged directly adjacent to one another and are separated by a web only. They adjoin each other.

The damping member may advantageously have a two-part design, the two parts of the damping member forming in their contact area a parting plane, which is directed at right angles to the longitudinal axis of the bush bearing. Due to this division of the damping member, pretension can advantageously be achieved within the two-part damping member in the axial direction. The pretension is maintained via the outer sleeve, and the outer sleeve may likewise be designed as a two-part sleeve for this purpose in a preferred embodiment. The two parts of the outer sleeve now form, in their contact area, a contact zone, which extends through the entire web. The web is thus also of a two-part design. The contact zone of the outer sleeve and the parting plane of the two parts of the damping member are located in a common plane. Due to the two-part design of the damping member and of the outer sleeve, simplified manufacture of the bush bearing is also achieved, moreover, in terms of improved assembly and vulcanization conditions.

In a second preferred embodiment, the web connecting the outer sleeve to the outer bush or to the channel carrier may be designed as an additional element, which is fastened to the outer sleeve, for example, by means of a screw connection or another non-positive or positive-locking connection. A fastening plate with holes is arranged for this purpose at the additional element at right angles to the web, and this fastening plate may be made, for example, in one piece with the web. The manufacture of the bush bearing can be further simplified by means of this additional element, and, moreover, pretensioning of the two parts of the elastomeric damping member can be advantageously applied in a specific manner and permanently maintained.

The channel carrier, in which the damping channels connecting the chambers are formed, is especially advantageously arranged between the outer sleeve and the outer bush. Due to the relatively large diameter of the channel carrier, it is possible to vary the different damping channels in many different ways in order to thus achieve a substantially greater shift of the effective frequency band. The frequency positions and the values of the damping maxima can be set separately by means of the separate damping channels for the first chamber pair and the second chamber pair. If, moreover, the channel carrier extends over the entire axial extension of the outer bush in a preferred embodiment, effective mechanical support of the outer bush is, moreover, achieved, because the channel carrier can absorb part of the acting forces. The outer bush can thus be designed as a whole for lower loads.

It may be advantageous for the manufacturing effort and the design effort as well as for the use-related properties if the bush bearing as a whole as well as the individual components, especially the inner part, the parts of the outer sleeve and the parts of the elastomeric damping member are made symmetrical in relation to one another. For example, a damping characteristic tuned predominantly in two directions in space can be obtained especially by the symmetrical design of the chambers of the chamber pairs. The symmetry is related here to two planes, which extend at right angles to one another and within which the longitudinal axis of the bush bearing extends, as well as to a plane extending at right angles to the longitudinal axis of the bush bearing.

The symmetric design of the bush bearing facilitates, moreover, the manufacture of a series of hydraulic bearings according to a modular system. For example, a large number of bush bearings with different damping properties adapted to the particular requirements can be created for an outer bush with a fixed external diameter by selecting different inner components, for example, channel carrier, inner part or outer sleeve.

Other measures improving the present invention are described in the subclaims or are represented in greater detail below together with the description of a preferred exemplary embodiment of the present invention on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a sectional view along section line VII-VII in FIG. 5 and also showing the outer sleeve and channel carrier;

FIG. 8 is a sectional view along section line VIII-VIII in FIG. 7; and

DESCRIPTION OF THE PREFERRED EMBODIMENTS

Figure 1:
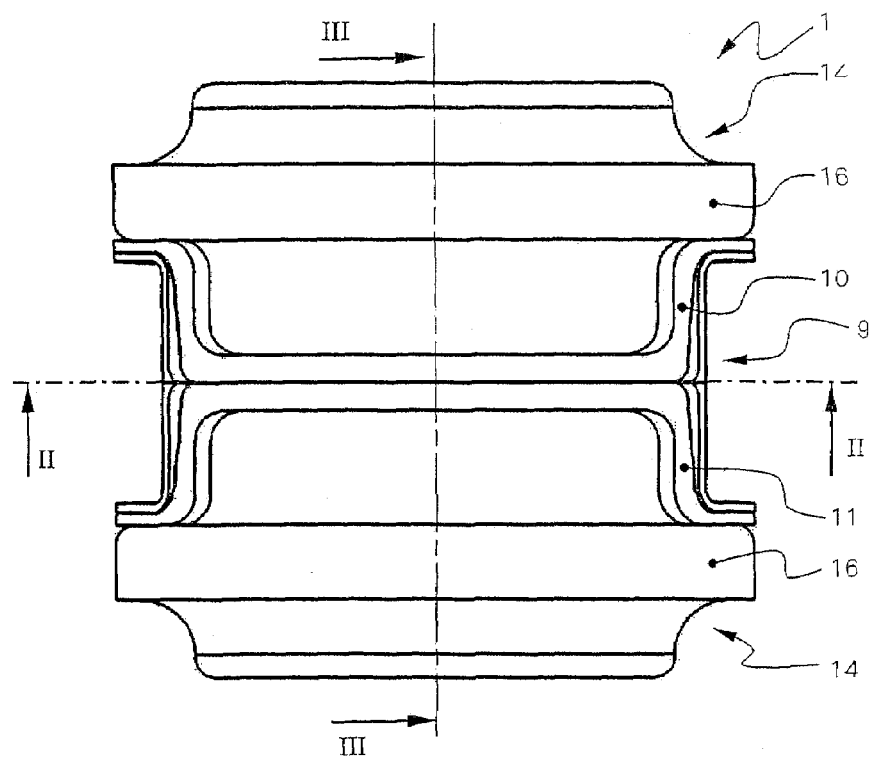
FIG. 1 is a side view of a first embodiment of the bush bearing according to the present invention without outer sleeve and channel carrier.

Referring to the drawings in particular, FIGS. 1 through 4 show a first exemplary embodiment of a bush bearing 1 according to the present invention. The bush bearing 1 has a preferably metallic inner part 2, for example, one consisting of aluminum, with a cylindrical through hole 3 along the longitudinal axis 4 of the bush bearing 1, wherein the hole 3 may also assume any other shape, for example, that of a hexagon socket, and may be designed, for example, as a blind hole. The inner part 2 is provided in a middle area of the bush bearing 1 with two radially opposite and radially outwardly extending projections 5, wherein the inner part 2 is surrounded by a two-part elastomeric damping member 6. The elastomeric damping member 6 comprising an upper damping part 7 and a lower damping part 8 is vulcanized to the inner part 2 and represents two thrust or thrust-compression assemblies, which are arranged within a two-part outer sleeve 9 and are likewise vulcanized to same, wherein the upper and lower outer sleeve parts 10, 11 compress the damping parts 7, 8 and apply a pretension to the elastomeric damping part 6. The outer sleeve 9 is surrounded by an outer bush 12, and a cylindrical channel carrier 13 is arranged between the outer bush 12 and the outer sleeve 9.

A conical rubber bearing 14 each is pressed onto the inner part at the axial end areas by means of an inner support ring 15, the rubber bearing 14 being inserted into the outer bush 12 or the channel carrier 13 by means of a support ring 16, for example, by press fit.

Figure 2:
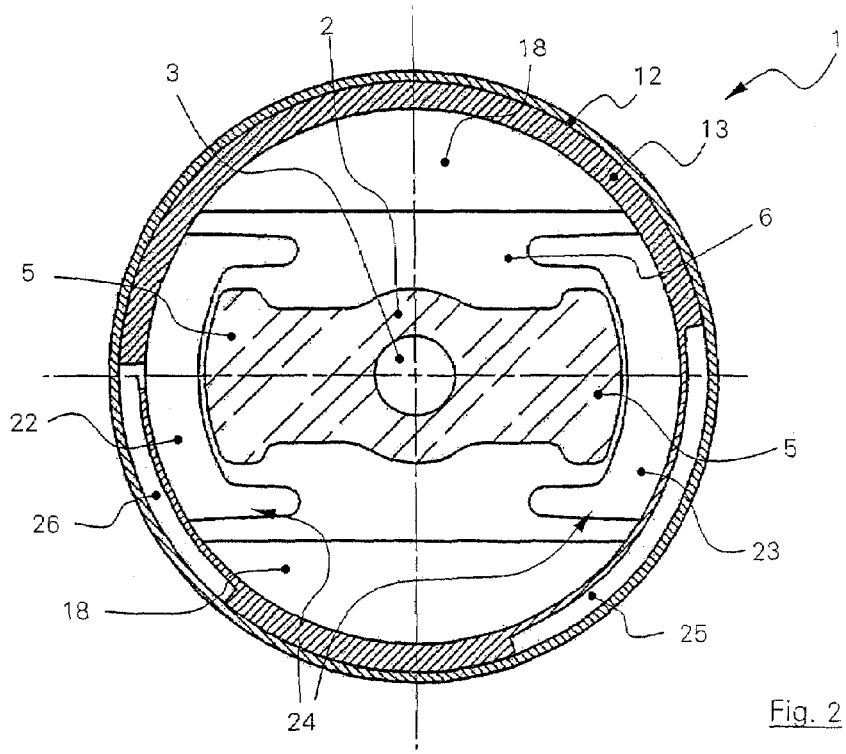
FIG. 2 is a sectional view along section line II-II in FIG. 1 and also showing the outer sleeve and channel carrier.
Figure 3:
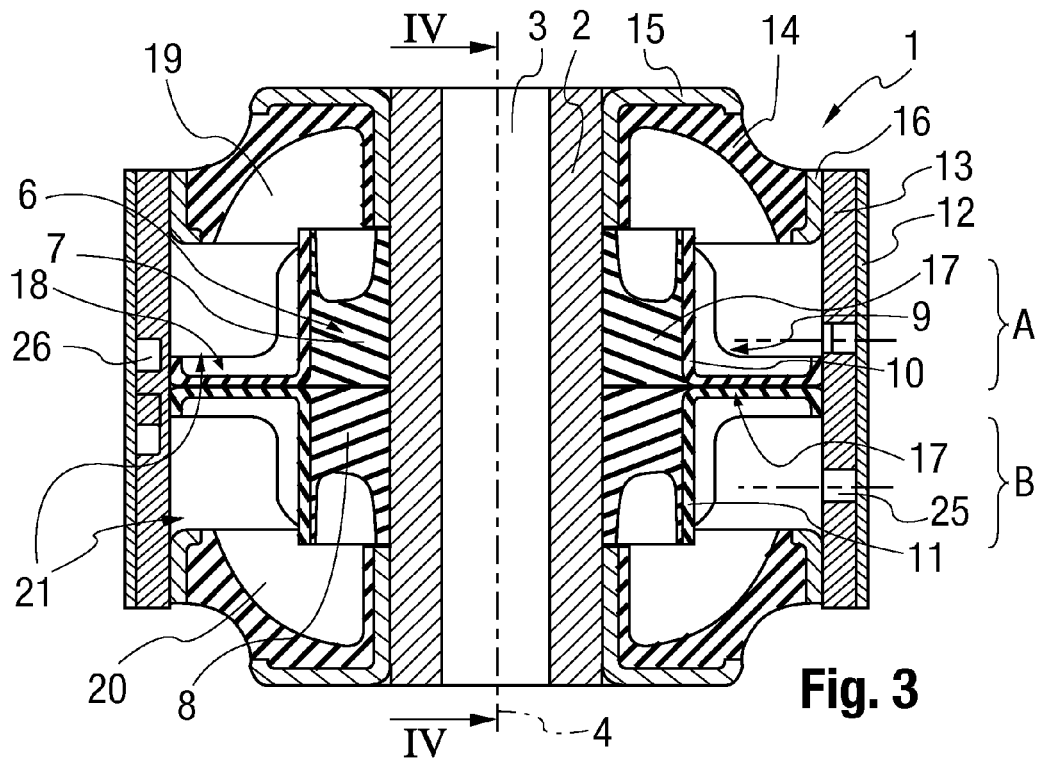
FIG. 3 is a sectional view along section line III-III in FIG. 1 and also showing the outer sleeve and channel carrier.
Figure 4:
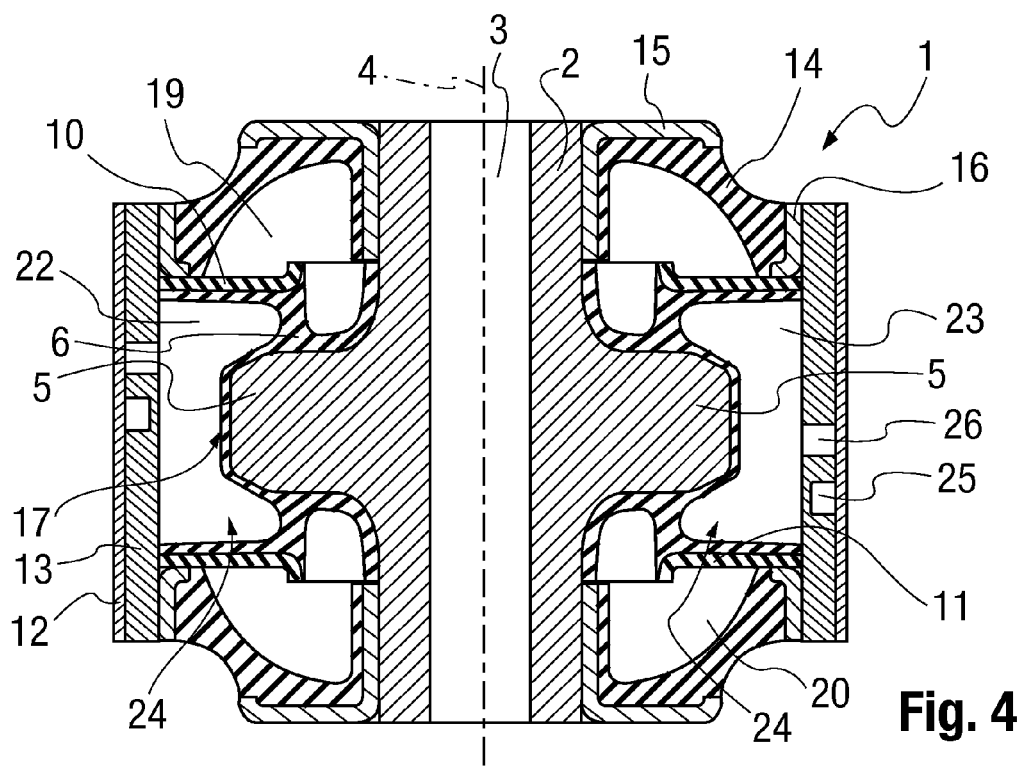
FIG. 4 is a sectional view along section line IV-IV in FIG. 3.
Figure 5:
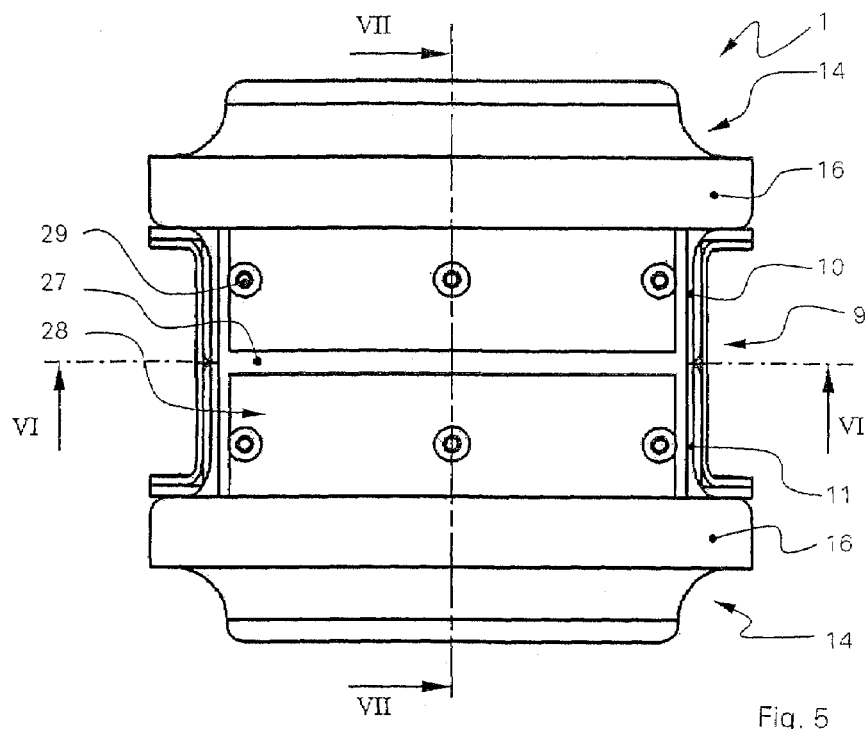
FIG. 5 is a side view showing a second embodiment of the bush bearing according to the present invention without outer bush and channel carrier.
Figure 6:
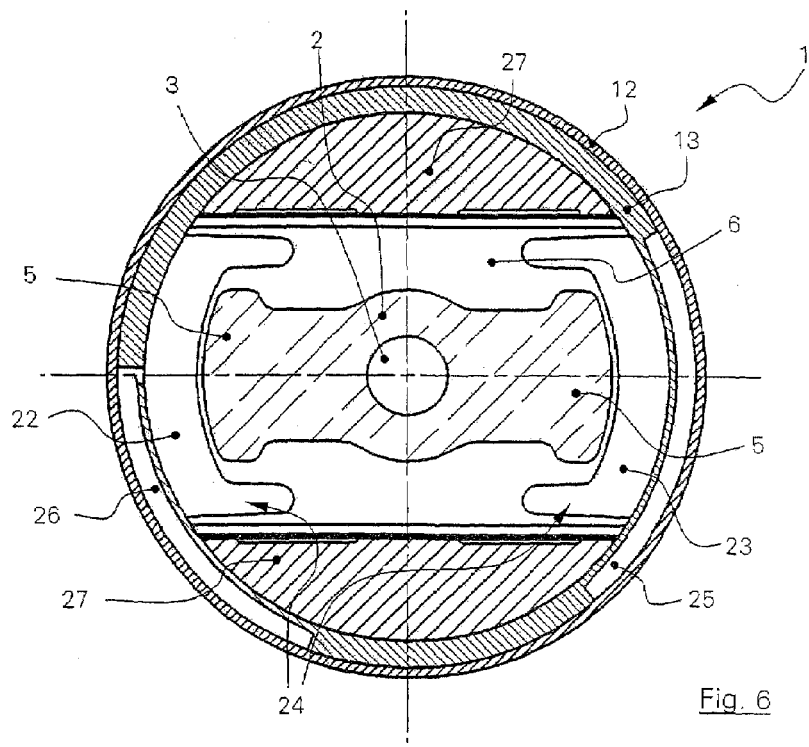
FIG. 6 is a sectional view along section line VI-VI in FIG. 5 and also showing the outer sleeve and channel carrier.

The upper and lower damping parts form, in their contact area, a parting plane 17, which is located in a common plane with the contact zone 17' of the upper and lower outer sleeve parts 10, 11. In the lateral area of the projections 5 of the inner part 2, the outer sleeve 9 is located at a spaced location from the outer bush 12 and the channel carrier 13. Approximately in the center of the bush bearing 1, the outer sleeve 9 is therefore provided with a web 18, which represents the connection between the outer sleeve 9 and the outer bush 12 or the channel carrier 13. In a top view, the web 18 is seen as a segment of a circle (FIG. 2). Like the outer sleeve as a whole, the web 18 also has a two-part design in this exemplary embodiment, so that the contact zone 17' continues into the web 18.

Together with the elastomeric damping member 6 as well as the outer sleeve 9 and, as a radial limitation, with the channel carrier 13 or the outer bush 12, the rubber bearings 14 arranged at the axial ends form an upper and a lower chamber 19, 20 each, which form a first chamber pair 21, which is separated from one another by the web 18 in the area of the parting plane 17. In the radially outer area of the projections 5, depressions prepared in the elastomeric damping member 6 form, together with the outer bush 12 and the channel carrier 13, two radial chambers 22, 23, which form a second chamber pair 24. The chambers 19, 20, 22 and 23 are filled with a hydraulic fluid.

Figure 9:
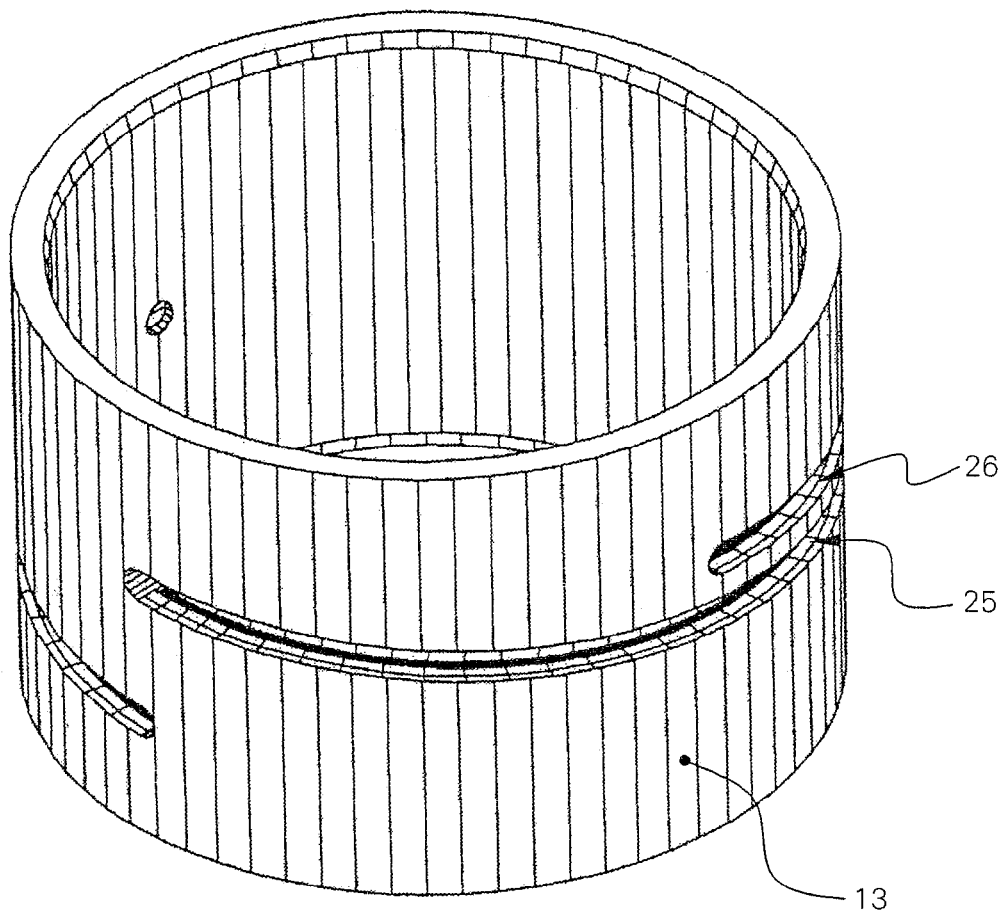
FIG. 9 is a three-dimensional view of the channel carrier as an individual component.

The two chambers 19, 20 of the first chamber pair 21 are connected to one another via a first damping channel 25 arranged in the channel carrier 13, and the two chambers 22, 23 of the second chamber pair 24 are connected to one another via a second damping channel 26, which is likewise arranged in the channel carrier 13 (cf. FIG. 9). The first chamber pair 21 thus forms a damping of the bush bearing 1 axially in relation to the longitudinal axis 4, whereas the second chamber pair 24 brings about a radial damping action of the bush bearing 1. The arrangement of the damping channels 25, 26 in a radially outer area of the bush bearing 1 makes possible great, freely selectable variation of the design of the damping channel volume to affect the damping properties of the bush bearing 1.

The channel carrier 13 extends in the axial direction over the entire length of the outer bush 12 in the embodiment shown. On the one hand, the possibilities of arrangement of the damping channels are expanded hereby, and, on the other hand, the channel carrier 13 supports the outer bush 12, because it can also participate in carrying mechanical loads acting on it. In another embodiment, it is absolutely conceivable to design the outer bush 12 and the channel carrier 13 as a common component. As an alternative, the channel carrier 13 may also be arranged radially outside the outer bush 12. Puncturing holes for the damping channels 25, 26 are now to be provided for this purpose in the outer bush 12.

The radially acting chambers 22, 23 of the second chamber pair 24 are not arranged over the entire circumference of the bush bearing 1, but only extend into a certain, limited section. Outside these areas, the radially acting chambers 22, 23 are surrounded by the axially acting chambers 19, 20, so that the chambers 19, 20 of the first chamber pair 21 and the chambers 22, 23 of the second chamber pair 24 overlap in partial areas A, B that are axial to the longitudinal axis 4. Thus, at least part of the volume of the axially acting chambers 19, 20 is displaced into central areas of the bush bearing 1, as a result of which a highly compact bush bearing 1 is obtained. The compact design is supported by the fact that the axially acting chambers 19, 20 are arranged such that they are separated from one another by the web 18 only. The axially acting chambers 19, 20 are also located along a plane parallel to the longitudinal axis 3 directly adjacent to the radially acting chambers 22, 23, and this plane may also definitely be inclined in relation to the longitudinal axis 3. The axially acting chambers 19, 20 are separated from one another and from the radially acting chambers 22, 23 only by an area of the outer sleeve 9 or an area of the upper or lower outer sleeve part 10, 11 as well as a thin layer of the elastomeric damping member 6.

The two-part design of the outer sleeve 9 also makes simplified manufacture possible, besides the application of an advantageous pretension to the elastomeric damping member 6, as a result of which the manufacturing effort can be reduced. For example, the shrinkage strain introduced by the vulcanization operation can be reduced by the pretension on the elastomeric damping member 6 or on the upper and lower damping part 7, 8. As can be recognized from the figures, the elastomeric damping member 6 stresses a small volume only, as a result of which reduced use of material can be achieved.

The embodiment shown in FIGS. 5 through 8 differs from the embodiment described so far only in that the web 18, which was of a two-part design in the first exemplary embodiment, has been replaced by an additional element 27. The additional element 27 is in the form of a segment of a circle on both sides of the bush bearing 12 and has a fastening plate 28 standing at right angles to the parting plane 17. The additional element 27 is fastened to the outer sleeve 9 by means of a screw connection 29 with holes 30 arranged in the fastening plate 28. The additional element 27 and the fastening plate 28 are preferably made in one piece. As an alternative to the screw connection 29, the additional element 27 may also be fastened to the outer sleeve 9 by means of other types of connection, for example, by means of a clip connection or a riveted connection.

Secure fixation of the two outer sleeve parts 10, 11 to one another is created by means of the additional element 27 in order to make it possible to guarantee the pretension in the elastomeric damping member 6 at any time. Moreover, assembly is also simplified hereby, which leads to a further reduction of the manufacturing effort.

The bush bearing 1 has a design symmetrical both radially and axially to the longitudinal axis 4. All essential components, such as the inner part 2, the elastomeric damping member 6, the outer sleeve 9, the rubber bearings 14 as well as the outer bush 12 are of a symmetrical design. Only the channel carrier 13 lacks perfect symmetry because of the formation of the damping channels 25, 26. The symmetry of the bush bearing 1 makes possible a uniform damping action in at least two directions in space. Moreover, the symmetry results in advantages in terms of design and manufacturing technology, which lower the manufacturing effort needed for manufacturing the bush bearing 1.

Moreover, the design of the bush bearing 1 makes possible the implementation of a modular system, because all essential components can be replaced by components of the same type possessing other properties. For example, the channel carrier 13 can be replaced with a channel carrier 13 with modified damping channels 25, 26 in a simple manner. In the same manner, the rubber bearing 14 can also be replaced or another inner part 2 can be used. The volume and the flexibilities of the axially and radially acting chambers 19, 20, 22 and 23 can be set especially by the use of different inner parts 2, elastomeric damping members 6 and/or rubber bearings 14 as well as different outer sleeves 9 in order to create different bearings with different damping properties.

While specific embodiments of the invention have been shown and described in detail to illustrate the application of the principles of the invention, it will be understood that the invention may be embodied otherwise without departing from such principles.

The invention claimed is:

1. A hydraulically damping bush bearing comprising:
   an inner part with a hole extending along a longitudinal axis;
   an outer sleeve surrounding said inner part;
   an elastomeric damping member arranged between said inner part and said outer sleeve;
   two chamber pairs including a first chamber pair with two separate first chambers each filled with hydraulic fluid and a second chamber pair with at least two separate second chambers each filled with hydraulic fluid, wherein said two first chambers of said first chamber pair are arranged axially along said longitudinal axis, said two second chambers of said second chamber pair are arranged radially in relation to said longitudinal axis and are arranged between said two first chambers of said first chamber pair in the axial direction of said longitudinal axis;
   a channel carrier including a first damping channel and a second damping channel, said channel carrier connecting one of said first chambers to another of said first chambers via said first damping channel, said channel carrier connecting one of said second chambers to another of said second chambers via said second damping channel, said first damping channel and said second damping channel being arranged in or at said channel carrier; and
   an outer bush surrounding said elastomeric damping member, said outer sleeve, said channel carrier as well as said two chamber pairs, said first chambers of said first chamber pair and said second chambers of said second chamber pair overlapping at least in some areas at least in a partial area that is axial in relation to said longitudinal axis.

2. A hydraulically damping bush bearing in accordance with claim 1, wherein said outer sleeve has a distance from said outer bush or from said channel carrier in said at least one said partial area.

3. A hydraulically damping bush bearing in accordance with claim 2, wherein in the area of said partial area that is located at a spaced location from said outer bush, said outer sleeve is in contact with said outer bush or with said channel carrier via at least one web, wherein said web separates said first chambers of said first chamber pair from one another.

4. A hydraulically damping bush bearing in accordance with claim 3, wherein said outer sleeve is in contact with said channel carrier via at least one web, said at least one web extending from said outer sleeve to said channel carrier in a radial direction.

5. A hydraulically damping bush bearing in accordance with claim 4, wherein:
   said outer sleeve has a two part design comprising two outer sleeve parts; and
   said elastomeric damping member has a two-part design comprising two elastomeric damping parts, wherein the contact area of said elastomeric damping parts is designed as a parting plane.

6. A hydraulically damping bush bearing in accordance with claim 5, wherein said outer sleeve parts form a contact zone, said contact zone being located in a common plane with said parting plane of said elastomeric damping parts.

7. A hydraulically damping bush bearing in accordance with claim 6, wherein said common plane is perpendicular to said longitudinal axis.

8. A hydraulically damping bush bearing in accordance with claim 3, wherein said web is designed as an additional element, which connects said two outer sleeve parts to one another.

9. A hydraulically damping bush bearing in accordance with claim 1, wherein said outer sleeve has a two-part design comprising two said outer sleeve parts.

10. A hydraulically damping bush bearing in accordance with claim 9, wherein said two parts of said outer sleeve are symmetrical to one another.

11. A hydraulically damping bush bearing in accordance with claim 9, wherein:
    said elastomeric damping member has a two-part design comprising two elastomeric damping parts, wherein the contact area of said elastomeric damping parts is designed as a parting plane; and
    said two outer sleeve parts form a contact zone, which is located in a common plane with said parting plane of said elastomeric damping parts.

12. A hydraulically damping bush bearing in accordance with claim 1, wherein said outer sleeve forms a fixed partition between a first chamber of said first chamber pair and a second chamber of said second chamber pair at least in partial areas.

13. A hydraulically damping bush bearing in accordance with claim 12, wherein said additional element is connected to said outer sleeve or said two outer sleeve parts via a non-positive or positive-locking connection.

14. A hydraulically damping bush bearing in accordance with claim 13, wherein said non-positive or positive-locking connection is designed as a screw connection.

15. A hydraulically damping bush bearing in accordance with claim 1, wherein said channel carrier is arranged between said outer sleeve and said outer bush.

16. A hydraulically damping bush bearing in accordance with claim 15, wherein said channel carrier has a cylindrical shape and extends essentially over the entire extension of said outer bush, which said extension is axial in relation to said longitudinal axis.

17. A hydraulically damping bush bearing in accordance with claim 1, wherein said one of said first chambers and said another of said first chambers are arranged symmetrically such that said one of said first chambers is symmetrical to said another of said first chambers, said one of said second chambers and said another of said second chambers being arranged symmetrically such that said one of said second chambers is symmetrical to said another of said second chambers.

18. A hydraulically damping bush bearing in accordance with claim 1, wherein said inner part has two said projections, which are located opposite each other in the radial direction and are directed in the direction of said second chambers of said second chamber pair.

19. A hydraulically damping bush bearing in accordance with with claim 1, wherein said elastomeric damping member has a two-part design comprising two elastomeric damping parts, wherein the contact area of said elastomeric damping parts is designed as a parting plane.

20. A hydraulically damping bush bearing comprising:
an inner part with a hole extending along a longitudinal axis;
an outer sleeve surrounding said inner part;
an elastomeric damping member arranged between said inner part and said outer sleeve;
a first pair of chambers with two separate first chambers each filled with hydraulic fluid; a second pair of chambers with at least two separate second chambers, each of said second chambers being filled with hydraulic fluid, wherein said two first chambers of said first pair chambers are spaced apart axially in relation to said longitudinal axis, said two second chambers of said second pair of chambers being arranged spaced apart radially in relation to said longitudinal axis and being arranged between said two first chambers of said first pair of chambers in the axial direction of said longitudinal axis;
a channel carrier means defining a damping channel for connecting one of said first chambers to another of said first chambers and for connecting one of said second chambers to another of said second chambers; and
an outer bush surrounding said elastomeric damping member, said outer sleeve, said channel carrier as well as said first pair of chambers and said second pair of chambers, said first chambers of said first pair of chambers and said second chambers of said second pair of chambers having overlapping extents in an axially extending partial area.

21. A hydraulically damping bush bearing in accordance with claim 20, wherein said channel carrier is arranged between said outer sleeve and said outer bush.

22. A hydraulically damping bush bearing in accordance with claim 21, wherein said channel carrier has a cylindrical shape and extends essentially over an entire extension of said outer bush, which said extension is axial in relation to said longitudinal axis.

23. A hydraulically damping bush bearing in accordance with claim 20, wherein said one of said first chambers and said another of said first chambers are arranged symmetrically such that said one of said first chambers is symmetrical to said another of said first chambers, said one of said second chambers and said another of said second chambers being arranged symmetrically such that said one of said second chambers is symmetrical to said another of said second chambers.

24. A hydraulically damping bush bearing in accordance with claim 20, wherein said outer sleeve has a distance from said outer bush or from said channel carrier in said partial area.

* * * * *